US012486352B2

(12) United States Patent
Imagawa et al.

(10) Patent No.: US 12,486,352 B2
(45) Date of Patent: Dec. 2, 2025

(54) COMPOSITION, AND OPTICAL MATERIAL AND LENS USING SAME

(71) Applicant: MITSUBISHI GAS CHEMICAL COMPANY, INC., Tokyo (JP)

(72) Inventors: Yousuke Imagawa, Tokyo (JP); Kouhei Takemura, Tokyo (JP); Ryosuke Sugihara, Tokyo (JP); Mariko Sado, Tokyo (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 364 days.

(21) Appl. No.: 18/030,847

(22) PCT Filed: Sep. 10, 2021

(86) PCT No.: PCT/JP2021/033315
§ 371 (c)(1),
(2) Date: Apr. 7, 2023

(87) PCT Pub. No.: WO2022/085330
PCT Pub. Date: Apr. 28, 2022

(65) Prior Publication Data
US 2023/0374191 A1    Nov. 23, 2023

(30) Foreign Application Priority Data
Oct. 19, 2020    (JP) ................. 2020-175427

(51) Int. Cl.
| C08G 18/38 | (2006.01) |
| G02B 1/04 | (2006.01) |
| G02C 7/02 | (2006.01) |

(52) U.S. Cl.
CPC ......... C08G 18/3855 (2013.01); G02B 1/041 (2013.01); G02C 7/02 (2013.01)

(58) Field of Classification Search
CPC .... C08G 18/3855; C08G 75/08; G02B 1/041; G02B 1/04; G02C 7/02; G02C 7/00; C08L 81/02; C07D 331/02; C07D 341/00; C07C 321/14
See application file for complete search history.

(56) References Cited

U.S. PATENT DOCUMENTS

| 5,945,504 A | 8/1999 | Amagi et al. |
| 6,765,071 B1 | 7/2004 | Fujishiro et al. |
| 2016/0259091 A1 | 9/2016 | Horita et al. |
| 2020/0024450 A1 | 1/2020 | Nishimori et al. |
| 2021/0340129 A1 | 11/2021 | Takemura et al. |
| 2023/0339921 A1* | 10/2023 | Imagawa ............. C07D 409/14 |
| 2024/0052105 A1* | 2/2024 | Imagawa ................ C08L 81/02 |

FOREIGN PATENT DOCUMENTS

| EP | 3 584 269 A1 | 12/2019 |
| EP | 3 828 181 A1 | 6/2021 |
| EP | 4 230 616 A | 8/2023 |
| JP | 9-255781 A | 9/1997 |
| JP | 2001-151888 A | 6/2001 |
| JP | 2002-97223 A | 4/2002 |
| JP | 2002-194083 A | 7/2002 |
| JP | 2006-89598 A | 4/2006 |
| JP | 2012-21080 A | 2/2012 |
| JP | 2015-69087 A | 4/2015 |
| JP | 2019-210358 A | 12/2019 |
| WO | 2015/098718 A1 | 2/2015 |
| WO | 2018/150950 A1 | 8/2018 |
| WO | 2020/021953 A1 | 1/2020 |

OTHER PUBLICATIONS

Supplementary European Search Report issued Nov. 27, 2023 in corresponding European family member application No. 21882471.2.

International Search Report issued Oct. 26, 2021 in International Bureau of WIPO Patent Application No. PCT/JP2021/033315, along with an English translation thereof.

Written Opinion issued Oct. 26, 2021 in International Bureau of WIPO Patent Application No. PCT/JP2021/033315, along with an English translation thereof.

* cited by examiner

*Primary Examiner* — James C. Jones
(74) *Attorney, Agent, or Firm* — GREENBLUM & BERNSTEIN, P.L.C.

(57) ABSTRACT

A composition containing: a compound (a) represented by Formula (1):

$$R^1{}_n\!-\!Ar\!-\!\left[S\!-\!S\!-\!\triangle\right]_m \quad (1)$$

wherein Ar represents an aromatic ring, m represents an integer of 2 to 8, n represents an integer of 0 to 6, provided that m+n is equal to or less than a number of carbon atoms that constitute the aromatic ring, and $R^1$ each independently represents an alkylthio group, an epoxyalkylthio group, a thiol group, a halogen group, a hydroxy group, a dialkylthiocarbamoyl group, or a dialkylcarbamoylthio group; and 1,2,3,5,6-pentathiepane (b).

15 Claims, No Drawings

COMPOSITION, AND OPTICAL MATERIAL AND LENS USING SAME

TECHNICAL FIELD

The present invention relates to a composition, and an optical material and a lens using same.

BACKGROUND ART

Optical materials, particularly optical materials used for applications such as spectacle lenses, are required to have optical performance such as heat resistance, low specific gravity, high transparency, low yellowness, high refractive index, and high Abbe's number. In recent years, further improvement in performance is required, and in particular, an optical material having a high refractive index and a high Abbe's number is required.

As a material for achieving a high refractive index and a high Abbe's number, a polymerizable composition for optical materials that contains an episulfide compound has attracted attention. For example, Patent Literature 1 Patent Literature 1 describes an invention relating to a polymerizable composition containing a thioepoxy compound having one or more disulfide bonds in a molecule, in which a cured resin of the polymerizable composition has a refractive index (nd) of 1.71 or more. It is described that, in this case, bis(2,3-epithiopropyl)disulfide is most preferable as the thioepoxy compound having one or more disulfide bonds in a molecule.

CITATION LIST

Patent Literature

Patent Literature 1: JP 2002-194083 A

SUMMARY OF INVENTION

Technical Problem

With use of the polymerizable composition described in Patent Literature 1, an optical material having a high refractive index can be obtained. However, an optical material having a still higher refractive index is required. It has been found that when sulfur or the like is added in order to further increase the refractive index of the optical material, heat resistance may be deteriorated. Therefore, the present invention provides a composition capable of yielding an optical material having a high refractive index and excellent heat resistance.

Solution to Problem

The present inventors have conducted intensive studies to solve the above-mentioned problem. As a result, the present inventors have found that the above-mentioned problem can be solved by combining an episulfide compound having an aromatic skeleton with 1,2,3,5,6-pentathiepane, and have completed the present invention. That is, the present invention is, for example, as follows.

[1] A composition containing:
a compound (a) represented by Formula (1):

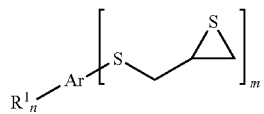

wherein
Ar represents an aromatic ring,
m represents an integer of 2 to 8,
n represents an integer of 0 to 6,
provided that m+n is equal to or less than a number of carbon atoms that constitute the aromatic ring, and
$R^1$ each independently represents an alkylthio group, an epoxyalkylthio group, a thiol group, a halogen group, a hydroxy group, a dialkylthiocarbamoyl group, or a dialkylcarbamoylthio group; and
1,2,3,5,6-pentathiepane (b).

[2] The composition according to [1], wherein m is 2 or 3.

[3] The composition according to [1] or [2], wherein m+n is 2 to 6.

[4] The composition according to any one of [1] to [3], wherein a content of the compound (a) is 20 to 80 mass % with respect to a total mass of the composition.

[5] The composition according to any one of [1] to [4], wherein a content of the 1,2,3,5,6-pentathiepane (b) is 5 to 40 mass % with respect to a total mass of the composition.

[6] The composition according to any one of [1] to [5], further containing a compound (c) represented by Formula (2):

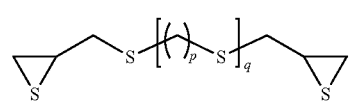

wherein
p represents an integer of 0 to 4, and
q represents an integer of 0 to 2.

[7] The composition according to [6], wherein a content of the compound (c) is 5 to 40 mass % with respect to a total mass of the composition.

[8] The composition according to any one of [1] to [7], further containing a polythiol (d).

[9] The composition according to [8], wherein the polythiol (d) includes at least one selected from the group consisting of 1,2,6,7-tetramercapto-4-thiaheptane, methanedithiol, (sulfanylmethyldisulfanyl)methanethiol, bis(2-mercaptoethyl)sulfide, 2,5-bis(mercaptomethyl)-1,4-dithiane, 1,2-bis(2-mercaptoethylthio)-3-mercaptopropane, 4,8-dimercaptomethyl-1,11-dimercapto-3,6,9-trithiaundecane, 4,7-dimercaptomethyl-1,11-dimercapto-3,6,9-trithiaundecane, 5,7-dimercaptomethyl-1,11-dimercapto-3,6,9-trithiaundecane, 1,1,3,3-tetrakis(mercaptomethylthio)propane, tetramercaptopentaerythritol, 1,3-bis(mercaptomethyl)benzene, 1,4-bis(mercaptomethyl)benzene, and thiiranemethanethiol.

[10] The composition according to any one of [1] to [9], further containing sulfur.

[11] The composition according to any one of [1] to [10], further containing a prepolymerization catalyst.

[12] The composition according to [11], wherein the prepolymerization catalyst includes at least one selected from the group consisting of 2-mercapto-1-methylimidazole, 2-methyl-N-imidazole, and 1,2,2,6,6-pentamethylpiperidyl methacrylate.

[13] A pre-cured product obtained by prepolymerizing the composition according to any one of [1] to [12].

[14] An optical material obtained by curing the composition according to any one of [1] to [12] or the pre-cured product according to [13].

[15] An optical lens containing the optical material according to [14].

Advantageous Effects of Invention

According to the present invention, there is provided a composition capable of yielding an optical material having a high refractive index and excellent heat resistance.

DESCRIPTION OF EMBODIMENTS

Hereinafter, the present invention will be described in detail with reference to embodiments, examples, and the like, but the present invention is not limited to the following embodiments, examples, and the like, and can be carried out with any modifications without departing from the gist of the present invention.

<Composition>

The composition according to the present invention contains a compound (a) represented by Formula (1) and 1,2,3,5,6-pentathiepane (b). In addition, the composition may further contain a compound (c) represented by Formula (2), a polythiol (d), sulfur, a polymerizable compound, a prepolymerization catalyst, a polymerization catalyst, a polymerization modifier, additives, and the like.

When the composition contains the compound (a) represented by Formula (1), that is, an episulfide compound having an aromatic skeleton, the refractive index and heat resistance can be increased. In addition, when the composition contains the 1,2,3,5,6-pentathiepane (b), the refractive index can be further increased, and a combination of the components (a) and (b) can increase the refractive index and heat resistance of the obtained cured product (optical material). Therefore, the composition is preferably a composition for optical materials.

[Compound (a)]

The compound (a) is represented by Formula (1).

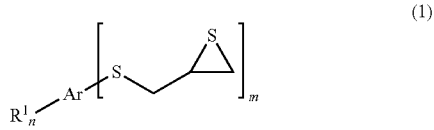

(1)

Ar represents an aromatic ring. Examples of the aromatic ring include an aromatic ring consisting of carbon and hydrogen, and a heteroaromatic ring (an aromatic ring containing a heteroatom). Ar has 2 or more carbon atoms, preferably 2 to 18 carbon atoms, more preferably 2 to 12 carbon atoms, and still more preferably 3 to 6 carbon atoms. Ar is preferably a 5-membered ring or a 6-membered ring, and more preferably a 6-membered ring.

The aromatic ring consisting of carbon and hydrogen is not particularly limited, and examples thereof include a benzene ring, a naphthalene ring, a fluorene ring, an anthracene ring, and a phenanthrene ring. Among these, a benzene ring is preferable for the aromatic ring consisting of carbon and hydrogen.

The heteroaromatic ring is not particularly limited, and examples thereof include a furan ring, a pyran ring, a pyrrole ring, an imidazole ring, a pyrazole ring, an oxazole ring, an isoxazole ring, a thiazole ring, an isothiazole ring, a triazole ring, a thiadiazole ring, a pyridine ring, a pyrazine ring, a pyrimidine ring, a pyridazine ring, a triazine ring, an indole ring, an isoindole ring, an indazole ring, a quinoline ring, an isoquinoline ring, a phthalazine ring, a phenanthridine ring, and an acridine ring. Among these, for the heteroaromatic ring, a furan ring, a pyran ring, a pyrrole ring, an imidazole ring, a pyrazole ring, an oxazole ring, an isoxazole ring, a thiazole ring, an isothiazole ring, a triazole ring, a thiadiazole ring, a pyridine ring, a pyrazine ring, a pyrimidine ring, a pyridazine ring, or a triazine ring is preferable, a triazine ring or a thiadiazole ring is more preferable, and a thiadiazole ring is still more preferable.

Among those described above, for Ar, an aromatic ring consisting of carbon and hydrogen is preferable, and a benzene ring is more preferable.

m represents an integer of 2 to 8, and is preferably 2, 3, or 6, more preferably 2 or 3, and still more preferably 3 from the viewpoint of heat resistance and simplicity of synthesis.

n represents an integer of 0 to 6, and is preferably 0 to 2, more preferably 0 or 1, and still more preferably 0.

m+n is equal to or less than the number of carbon atoms that constitute the aromatic ring, preferably 2 to 6, more preferably 3 to 6, still more preferably 2 to 3, and particularly preferably 3. Note that m+n of 3 is preferable because heat resistance is further increased. The phrase "equal to or less than the number of carbon atoms that constitute the aromatic ring" means that m+n does not exceed the number of carbon atoms contained in the aromatic ring. For example, in the case of a benzene ring that is an aromatic ring consisting of carbon and hydrogen, the number of carbon atoms that constitute the ring is 6, and therefore m+n is 6 or less. In the case of a thiadiazole ring that is a heteroaromatic ring, the number of carbon atoms that constitute the ring is 2, and therefore m+n is 2 or less.

$R^1$ each independently represents an alkylthio group, an epoxyalkylthio group, a thiol group, a halogen group, a hydroxy group, a dialkylthiocarbamoyl group, or a dialkylcarbamoylthio group.

The alkylthio group is not particularly limited, and examples thereof include a methylthio group, an ethylthio group, a propylthio group, a butylthio group, an isobutylthio group, a sec-butylthio group, a tert-butylthio group, a pentylthio group, and a hexylthio group.

The epoxyalkylthio group is not particularly limited, and examples thereof include a β-epoxypropylthio group.

The halogen group is not particularly limited, and examples thereof include a fluorine group (—F), a chlorine group (—Cl), a bromine group (—Br), and an iodine group (—I).

The dialkylthiocarbamoyl group is not particularly limited, and examples thereof include a dimethylthiocarbamoyl group, a diethylthiocarbamoyl group, and an ethylmethylthiocarbamoyl group.

In one embodiment, the compound (a) is represented by Formula (1').

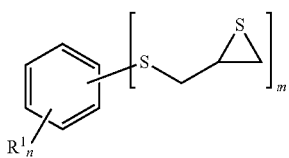

(1')

In Formula (1'), m represents an integer of 2 to 6, and is preferably 2, 3, or 6, more preferably 2 or 3, and still more preferably 3 from the viewpoint of color tone and simplicity of synthesis.

In Formula (1'), n represents an integer of 0 to 4, and is preferably 0 to 2, more preferably 0 or 1, and still more preferably 0.

In Formula (1'), m+n is 6 or less (m+n≤6), preferably 2 to 6, more preferably 3 to 6, and still more preferably 3. Note that m+n of 3 is preferable because heat resistance is further increased.

In Formula (1'), $R^1$ is the same as that in Formula (1).

Specific examples of the compound (a) include, but are not particularly limited to, bis(episulfide) compounds such as 1,3-bis(β-epithiopropylthio)benzene and 1,4-bis(β-epithiopropylthio)benzene; tris(episulfide) compounds such as 1,3,5-tris(β-epithiopropylthio)benzene, 1,2,4-tris(β-epithiopropylthio)benzene, and 1,2,5-tris(β-epithiopropylthio)benzene; alkylthio group-substituted bis(episulfide) compounds such as 1-methyl-3,5-bis(β-epothiopropylthio)benzene, 1-methyl-2,4-bis(β-epothiopropylthio)benzene, 1-methyl-2,5-bis(β-epothiopropylthio)benzene, 1-ethyl-3,5-bis(β-epothiopropylthio)benzene, and 1-t-butylthio-3,5-bis(β-epothiopropylthio)benzene; epoxyalkylthio group-substituted bis(episulfide) compounds such as 1-(β-epoxypropylthio)-3,5-bis(β-epothiopropylthio)benzene, 1-(β-epoxypropylthio)-2,4-bis(β-epothiopropylthio)benzene, and 1-(β-epoxypropylthio)-2,5-bis(β-epothiopropylthio)benzene; thiol group-substituted bis(episulfide) compounds such as 1-mercapto-3,5-bis(β-epothiopropylthio)benzene, 1-mercapto-2,4-bis(β-epothiopropylthio)benzene, and 1-mercapto-2,5-bis(β-epothiopropylthio)benzene; halogen group-substituted bis(episulfide) compounds such as 1-fluoro-3,5-bis(β-epothiopropylthio)benzene, 1-chloro-3,5-bis(β-epothiopropylthio)benzene, 1-bromo-3,5-bis(β-epothiopropylthio)benzene, 1-chloro-2,4-bis(β-epothiopropylthio)benzene, and 1-chloro-2,5-bis(β-epothiopropylthio)benzene; hydroxy group-substituted bis(episulfide) compounds such as 1-hydroxy-3,5-bis(β-epothiopropylthio)benzene, 1-hydroxy-2,4-bis(β-epothiopropylthio)benzene, and 1-hydroxy-2,5-bis(β-epothiopropylthio)benzene; dialkylthiocarbamoyl group-substituted bis(episulfide) compounds such as 1-dimethylthiocarbamoyl-3,5-bis(β-epothiopropylthio)benzene, 1-emethylthiocarbamoyl-3,5-bis(β-epothiopropylthio)benzene, 1-emethylthiocarbamoyl-2,4-bis(β-epothiopropylthio)benzene, and 1-emethylthiocarbamoyl-2,5-bis(β-epothiopropylthio)benzene; dialkylcarbamoylthio group-substituted bis(episulfide) compounds such as 1-dimethylcarbamoylthio-3,5-bis(β-epothiopropylthio)benzene, 1-emethylcarbamoylthio-3,5-bis(β-epothiopropylthio)benzene, 1-dimethylcarbamoylthio-2,4-bis(β-epothiopropylthio)benzene, and 1-dimethylcarbamoylthio-2,5-bis(β-epothiopropylthio)benzene; and heterocyclic compounds such as 2,5-bis(β-epithiopropylthio)-1,3,4-thiadiazole, 3,4-bis(β-epithiopropylthio)-1,2,5-thiadiazole, and 2,4,6-tris(β-epithiopropylthio)-1,3,5-triazine. Among these, 1,3-bis(β-epithiopropylthio)benzene, 1,4-bis(β-epithiopropylthio)benzene, 1,3,5-tris(β-epithiopropylthio)benzene, 1-alkylthio-3,5-bis(β-epothiopropylthio)benzene, 1-epoxyalkylthio-3,5-bis(β-epothiopropylthio)benzene, 1-thio-3,5-bis(β-epothiopropylthio)benzene, 1-halo-3,5-bis(β-epothiopropylthio)benzene, 1-hydroxy-3,5-bis(β-epothiopropylthio)benzene, 1-dialkylthiocarbamoyl-3,5-bis(β-epothiopropylthio)benzene, 1-alkylcarbamoylthio-3,5-bis(β-epothiopropylthio)benzene, 2,5-bis(β-epithiopropylthio)-1,3,4-thiadiazole, 3,4-bis(β-epithiopropylthio)-1,2,5-thiadiazole, or 2,4,6-tris(β-epithiopropylthio)-1,3,5-triazine is preferable, 1,3-bis(β-epithiopropylthio)benzene, 1,4-bis(β-epithiopropylthio)benzene, 1,3,5-tris(β-epithiopropylthio)benzene, 2,5-bis(β-epithiopropylthio)-1,3,4-thiadiazole, or 2,4,6-tris(β-epithiopropylthio)-1,3,5-triazine is more preferable, and 1,3,5-tris(β-epithiopropylthio)benzene is still more preferable. The above-mentioned compound (a) may be used alone or in combination of two or more kinds thereof.

The content of the compound (a) is preferably 0.1 to 99.5 mass %, more preferably 3 to 90 mass %, still more preferably 5 to 90 mass %, particularly preferably 20 to 80 mass %, very preferably 30 to 60 mass %, and most preferably 35 to 60 mass % with respect to the total mass of the composition. When the content of the compound (a) is within the above-mentioned range, sufficient heat resistance can be obtained.

1,2,3,5,6-Pentathiepane (b)

The 1,2,3,5,6-pentathiepane (b) is a compound represented by the formula, and has an effect of improving the refractive index of the obtained optical material.

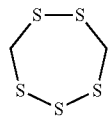

The method for obtaining the 1,2,3,5,6-pentathiepane (b) is not particularly limited, and a commercially available product may be used, or the 1,2,3,5,6-pentathiepane (b) may be collected and extracted from natural products such as crude oil and plants and animals, or may be synthesized by a known method. In the case of synthesizing the 1,2,3,5,6-pentathiepane (b), examples of the synthesis method include the methods described in N. Takeda, et al., Bull. Chem. Soc. Jpn., 68, 2757 (1995), F. Feher, et al., Angew. Chem. Int. Ed., 7, 301 (1968), and G. W. Kutney, et al., Can. J. Chem, 58, 1233 (1980).

The content of the 1,2,3,5,6-pentathiepane (b) is preferably 5 to 70 mass %, more preferably 5 to 40 mass %, and still more preferably 5 to 25 mass % with respect to the total mass of the composition. When the content of the 1,2,3,5,6-pentathiepane (b) is within the above-mentioned range, it is preferable because the obtained optical material can achieve both a high refractive index and high transparency.

The mass ratio of the compound (a) to the 1,2,3,5,6-pentathiepane (b) (compound (a):1,2,3,5,6-pentathiepane (b)) is preferably 25:75 to 95:5. When the mass ratio is within the above-mentioned range, it is preferable because the obtained optical material can achieve both a high refractive index and an excellent color tone.

[Compound (c)]

In one embodiment, the composition may further contain the compound (c). The compound (c) is represented by Formula (2). The compound (c) is copolymerizable with the compound (a), and has an effect of enhancing the curing reactivity when used together with the compound (a).

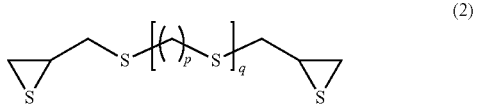

p represents an integer of 0 to 4, and is preferably 0 to 2, and more preferably 0 or 1.

q represents an integer of 0 to 2, and is preferably 0 to 2, and more preferably 0 or 1.

Specific examples of the compound (c) include, but are not particularly limited to, bis(β-epithiopropyl)sulfide and bis(β-epithiopropyl)disulfide. Among these, bis(β-epithiopropyl)sulfide is preferable. The above-mentioned compound (c) may be used alone or in combination of two or more kinds thereof. The bis(β-epithiopropyl)sulfide corresponds to a compound of Formula (2) in which p=q=0, and the bis(β-epithiopropyl)disulfide corresponds to a compound of Formula (2) in which p=0 and q=1.

The content of the compound (c) is 0 to 50 mass %, preferably 1 to 40 mass %, and more preferably 5 to 40 mass % with respect to the total mass of the composition. When the content of the compound (c) is within the above-mentioned range, it is preferable because curing reactivity can be improved while an excellent color tone is secured.

The mass ratio of the compound (a) to the compound (c) (compound (a):compound (c)) is preferably 40:60 to 100:0, and more preferably 50:50 to 100:0. When the mass ratio is within the above-mentioned range, it is preferable because both a high refractive index and an excellent color tone can be achieved.

[Polythiol (d)]

In one embodiment, the composition may further contain the polythiol (d). When the composition contains the polythiol (d), the obtained optical material can have an improved color tone upon heating. The polythiol (d) means a compound having two or more thiol groups (—SH) per molecule. Here, those corresponding to the compound (a) (episulfide compound having an aromatic skeleton) are not included in the polythiol (d).

The polythiol (d) is not particularly limited, but from the viewpoint of having a high color tone improving effect, the polythiol (d) is preferably 1,2,6,7-tetramercapto-4-thiaheptane, methanedithiol, (sulfanylmethyldisulfanyl)methanethiol, bis(2-mercaptoethyl)sulfide, 2,5-bis(mercaptomethyl)-1,4-dithiane, 1,2-bis(2-mercaptoethylthio)-3-mercaptopropane, 4,8-dimercaptomethyl-1,11-dimercapto-3,6,9-trithiaundecane, 4,7-dimercaptomethyl-1,11-dimercapto-3,6,9-trithiaundecane, 5,7-dimercaptomethyl-1,11-dimercapto-3,6,9-trithiaundecane, 1,1,3,3-tetrakis(mercaptomethylthio)propane, tetramercaptopentaerythritol, 1,3-bis(mercaptomethyl)benzene, 1,4-bis(mercaptomethyl)benzene, or thiiranemethanethiol, more preferably bis(2-mercaptoethyl)sulfide, 1,2,6,7-tetramercapto-4-thiaheptane, methanedithiol, (sulfanylmethyldisulfanyl)methanethiol, or 4,8-dimercaptomethyl-1,11-dimercapto-3,6,9-trithiaundecane, and still more preferably bis(2-mercaptoethyl) sulfide, 1,2,6,7-tetramercapto-4-thiaheptane, or 4,8-dimercaptomethyl-1,11-dimercapto-3,6,9-trithiaundecane. The above-mentioned polythiol (d) may be used alone or in combination of two or more kinds thereof.

The content of the polythiol (d) is preferably 0 to 25 mass %, more preferably 0.1 to 20 mass %, still more preferably 0.5 to 20 mass %, particularly preferably 1 to 15 mass %, and most preferably 1 to 10 mass % with respect to the total mass of the composition. When the content of the polythiol (d) is within the above-mentioned range, it is preferable because the balance between the color tone stabilizing effect and the heat resistance is improved.

In one embodiment, the total content of the 1,2,3,5,6-pentathiepane (b) and the polythiol (d) is preferably 5 to 50 mass %, more preferably 5 to 30 mass %, and still more preferably 5 to 25 mass % with respect to the total mass of the composition. When the total content is within the above-mentioned range, it is preferable because the obtained optical material has high heat resistance.

[Sulfur]

In one embodiment, the composition may further contain sulfur. When the composition contains sulfur, the obtained optical material can have improved refractive index.

The shape of sulfur is not particularly limited, and may be any shape. Specific examples of the shape include micronized sulfur, colloidal sulfur, precipitated sulfur, crystal sulfur, and sublimed sulfur. Among these, micronized sulfur is preferable from the viewpoint of the dissolution rate.

The particle size (diameter) of sulfur is preferably smaller than 10 mesh (mesh opening 1.70 mm), more preferably smaller than 30 mesh (mesh opening 500 μm), and still more preferably smaller than 60 mesh (mesh opening 250 μm). When the particle size of sulfur is smaller than 10 mesh, it is preferable because sulfur is easily dissolved.

The purity of sulfur is not particularly limited, but is preferably 98% or more, more preferably 99.0% or more, still more preferably 99.5% or more, and particularly preferably 99.9% or more. When the purity of sulfur is 98% or more, it is preferable because the obtained optical material can have a further improved color tone.

The content of sulfur is preferably 0 to 30 mass %, more preferably 0 to 25 mass %, still more preferably 0.1 to 20 mass %, and particularly preferably 1 to 15 mass % with respect to the total mass of the composition. When the content of sulfur is within the above-mentioned range, it is preferable because an excellent balance between the effect of improving the refractive index and the solubility is achieved.

[Polymerizable Compound]

In one embodiment, the composition may further contain the polymerizable compound. When the composition contains the polymerizable compound, physical properties of the optical material can be adjusted. The "polymerizable compound" means a compound that is copolymerizable with the compound (a).

The polymerizable compound is not particularly limited as long as it is a compound copolymerizable with the compound (a), and examples thereof include episulfide compounds other than the compound (a) and the compound (c), vinyl compounds, methacrylic compounds, acrylic compounds, and allyl compounds. These compounds may be used alone or in combination of two or more kinds thereof.

The addition amount of the polymerizable compound is not particularly limited as long as the effect of the present invention is not inhibited, and is, for example, preferably 0 to 30 mass %, more preferably 1 to 30 mass %, and still more preferably 1 to 20 mass % with respect to the total mass of the composition.

[Prepolymerization Catalyst]

In one embodiment, the composition may further contain the prepolymerization catalyst. When the composition contains the prepolymerization catalyst, a pre-cured product described later can be suitably produced.

The prepolymerization catalyst is not particularly limited, and examples thereof include imidazoles, phosphines, thioureas, quaternary ammonium salts, quaternary phosphonium salts, tertiary sulfonium salts, secondary iodonium salts, and hindered amines. Among these, imidazoles and hindered amines are preferable from the viewpoint of good compatibility with the composition.

The imidazoles are not particularly limited, and examples thereof include N-benzylimidazole, 4-methylimidazole, 4-ethylimidazole, 1-phenylimidazole, and 2-methyl-N-methylimidazole.

The hindered amines are not particularly limited, and examples thereof include hindered amines such as 1,2,2,6,6-pentamethylpiperidyl methacrylate, 1,2,2,6,6-pentamethylpiperidyl acrylate, and 1,2,2,6,6-pentamethylpiperidyl-4-vinylbenzoate.

The prepolymerization catalyst preferably includes, among these, at least one selected from the group consisting of 2-mercapto-1-methylimidazole, 2-methyl-N-imidazole, and 1,2,2,6,6-pentamethylpiperidyl methacrylate. The above-mentioned prepolymerization catalyst may be used alone or in combination of two or more kinds thereof.

The addition amount of the prepolymerization catalyst cannot be flatly determined because it varies depending on the components of the composition, the mixing ratio, and the polymerization curing method, but is usually preferably 0.0001 mass % to 10 mass %, and more preferably 0.003 mass % to 3.0 mass % with respect to 100 mass % in total of the compound (a), the 1,2,3,5,6-pentathiepane (b), the compound (c), the polythiol (d), and sulfur. When the addition amount of the prepolymerization catalyst is 0.0001 mass % or more, it is preferable because the prepolymerization reaction proceeds favorably. Meanwhile, when the addition amount of the prepolymerization catalyst is 10 mass % or less, it is preferable because the oxidation resistance is increased.

[Polymerization Catalyst]

In one embodiment, the composition may further contain the polymerization catalyst. When the composition contains the polymerization catalyst, the composition can be favorably polymerized to produce an optical material.

The polymerization catalyst is not particularly limited, and examples thereof include amines, phosphines, quaternary ammonium salts, quaternary phosphonium salts, tertiary sulfonium salts, secondary iodonium salts, mineral acids, Lewis acids, organic acids, silicic acids, tetrafluoroboric acids, peroxides, azo-based compounds, condensates of aldehydes and ammonia-based compounds, guanidines, thioureas, thiazoles, sulfenamides, thiurams, dithiocarbamates, xanthogenates, and acidic phosphate esters. Among these, amines, phosphines, quaternary ammonium salts, and quaternary phosphonium salts are preferable. These polymerization catalysts may be used alone or in combination of two or more kinds thereof.

The addition amount of the polymerization catalyst is preferably 0.0001 to 10 mass %, and more preferably 0.01 to 3 mass % with respect to the total mass of the composition.

[Polymerization Modifier]

In one embodiment, the composition may further contain the polymerization modifier.

The polymerization modifier is not particularly limited, and examples thereof include halides of Groups 13 to 16 in the long-form periodic table. Among these, halides of silicon, germanium, tin, and antimony are preferable, and chlorides of germanium, tin, and antimony that have an alkyl group are more preferable. These polymerization modifiers may be used alone or in combination of two or more kinds thereof.

The addition amount of the polymerization modifier is preferably 0.0001 to 5.0 mass %, and more preferably 0.01 to 2 mass % with respect to the total mass of the composition.

[Additives]

In one embodiment, the composition may further contain additives. The additives are not particularly limited, and examples thereof include an antioxidant, a bluing agent, an ultraviolet absorber, a deodorant, an adhesion improver, a releasability improver, and a radical polymerization initiator. These additives may be used alone or in combination of two or more kinds thereof.

The content of the additives is preferably 0 to 10 mass %, and more preferably 0.5 to 10 mass % with respect to the total mass of the composition.

[Chemical Composition of Composition]

In one embodiment, the composition has the following chemical composition. That is, the composition contains, with respect to the total amount of the composition:

20 to 90 mass %, preferably 20 to 80 mass % of the compound (a);

5 to 70 mass %, preferably 5 to 40 mass % of the 1,2,3,5,6-pentathiepane (b);

0 to 50 mass %, preferably 0 to 40 mass % of the compound (c);

0 to 10 mass %, preferably 0 to 5 mass % of the polythiol (d);

0 to 25 mass %, preferably 0 to 20 mass % of sulfur;

0 to 5 mass %, preferably 0 to 3 mass % of the prepolymerization catalyst;

0 to 5 mass %, preferably 0.0001 to 3 mass % of the polymerization catalyst; and 0 to 5 mass %, preferably 0.0001 to 3 mass % of the polymerization modifier.

<Method for Producing Composition>

The above-mentioned composition is not particularly limited, and can be produced by a known method. Specifically, the composition can be produced by mixing the compound (a) and the 1,2,3,5,6-pentathiepane (b), and optionally the compound (c), the polythiol (d), sulfur, and the like.

<Pre-Cured Product>

According to one aspect of the present invention, a pre-cured product is provided. The pre-cured product is obtained by prepolymerizing the above-mentioned composition. Production of the pre-cured product is preferable from the viewpoint that the rate of viscosity increase can be reduced, the transparency of the optical material is improved, handling becomes easy, and the like. In the present description, the "pre-cured product" means a liquid having a viscosity of 5,000 mps or less, and includes a polymer, a partial polymer, an oligomer, or the like formed by a polymerization reaction of at least one of the compound (a), the 1,2,3,5,6-pentathiepane (b), the compound (c), the polythiol (d), sulfur, and the polymerizable compound. In the present description, a value measured by the following method is adopted as the "viscosity".

[Viscosity Measurement Method]

The viscosity of the pre-cured product at 30° C. was measured using Cone/Plate Viscometer DV2THA CP (manufactured by Brookfield AMETEK).

<Method for Producing Pre-Cured Product>

According to one aspect of the present invention, a method for producing a pre-cured product is provided. The method for producing a pre-cured product includes a prepolymerization step of prepolymerizing the composition.

[Prepolymerization Step]

The prepolymerization step is a step of prepolymerizing the composition.

As the composition, the above-mentioned composition is used. The composition preferably contains the prepolymerization catalyst.

The prepolymerization step is preferably performed by casting the composition into a mold or the like from the viewpoint of performing a polymerization step described later subsequently to the prepolymerization. In this case, it is preferable to filter and remove impurities with a filter or the like having a pore diameter of about 0.1 to 5 μm before casting from the viewpoint of improving the quality of the optical material.

The temperature of the prepolymerization is preferably −10 to 160° C., more preferably 0 to 100° C., and still more preferably 20 to 80° C.

The prepolymerization time is preferably 0.1 to 480 minutes, more preferably 0.1 to 420 minutes, and still more preferably 0.1 to 360 minutes.

In one embodiment, the prepolymerization is preferably performed at −10 to 160° C. for 0.1 to 480 minutes, more preferably at 0 to 100° C. for 0.1 to 420 minutes, and still more preferably at 20 to 80° C. for 0.1 to 360 minutes.

The prepolymerization may be performed at normal pressure, under pressure, or under reduced pressure. When the prepolymerization is performed under reduced pressure, hydrogen sulfide that promotes the reaction is removed, so that the reaction usually proceeds gently as compared with the case where the prepolymerization is performed at normal pressure. Note that when the prepolymerization is performed at normal pressure, the prepolymerization may be performed in the atmosphere or in an inert gas.

In the prepolymerization step, it is preferable to detect the degree of progress of the prepolymerization reaction. The detection method is not particularly limited, and examples thereof include liquid chromatography, viscosity measurement, specific gravity measurement, and refractive index measurement. Among these, refractive index measurement is preferable because of simplicity. These detection methods may be used alone or in combination of two or more kinds thereof.

The degree of progress of the prepolymerization reaction is preferably detected in-line. In particular, when the prepolymerization is performed under pressure or under reduced pressure, it is more preferable to perform the detection in-line since it is not necessary to release the pressure or the reduced pressure for acquiring a measurement sample. In the case of performing the detection in-line, for example, in the case of performing the refractive index measurement in-line, it is possible to detect an increase in the refractive index accompanying the progress of the reaction and to control the degree of progress of the reaction by immersing a detection section of a refractometer in the composition yet to be prepolymerized and the reaction liquid of prepolymerization. In the case of a detection method in which the measured value changes depending on the temperature, such as the refractive index measurement, it is preferable to determine the relationship between the temperature of the detection section and the refractive index in advance by performing multiple regression analysis on the measurement temperature, the refractive index, the refractive index at the reference temperature, and the like. Specifically, it is preferable to use a refractometer provided with a temperature correction function capable of automatically converting the measured value into a refractive index at the reference temperature. Examples of the in-line type refractometer include a refractometer of a system in which a light emitting diode is used as a light source and an angle of prism reflected light is identified with a CCD cell.

<Optical Material>

According to one aspect of the present invention, an optical material is provided. The optical material is obtained by curing the above-mentioned composition or the above-mentioned pre-cured product. That is, the optical material is a cured product of the composition or the pre-cured product.

The optical material according to the present aspect has a high refractive index and excellent heat resistance.

Specifically, the refractive index of the optical material is preferably 1.74 or more, more preferably 1.75 or more, and still more preferably 1.76 or more. That is, the refractive index of the optical material obtained from the above-mentioned composition is preferably 1.74 or more, more preferably 1.75 or more, and still more preferably 1.76 or more. The value of the "refractive index" is measured by the method described in Examples.

In addition, the optical material has no softening point or has a high softening point, and thus has excellent heat resistance. Specifically, when being heated, the optical material has no softening point or has a softening point that is preferably 50° C. or more, more preferably 55° C. or more, still more preferably 60° C. or more, particularly preferably 70° C. or more, and most preferably 75° C. or more. That is, the optical material obtained from the above-mentioned composition has no softening point or has a softening point that is preferably 55° C. or more, more preferably 60° C. or more, particularly preferably 70° C. or more, and most preferably 75° C. or more. In the present description, the "softening point" is measured by the method described in Examples.

In addition, since the optical material is less likely to be softened, the optical material has excellent heat resistance. Specifically, the DTMA peak value (DTg) of the optical material is preferably 1.0 μm/° C. or less, more preferably 0.5 μm/° C. or less, and still more preferably 0.3 μm/° C. or less. As the DTMA peak value (DTg) is lower, softening by heat tends to be less likely to occur. That is, the DTMA peak value (DTg) of the optical material obtained from the above-mentioned composition is preferably 1.0 μm/° C. or less, more preferably 0.4 μm/° C. or less, and still more preferably 0.3 μm/° C. or less. In the present description, the "DTMA peak value (DTg)" means a peak value of DTMA that is a temperature differential curve of a TMA curve obtained by TMA (thermomechanical analysis), and is measured by the method of Examples.

Since the optical material according to the present aspect has a high refractive index and excellent heat resistance, it is possible to add various comonomers to the composition and increase the amount of the comonomers to be added, and this makes it possible to design an optical material having a wide range of physical properties.

<Method for Producing Optical Material>

According to one aspect of the present invention, a method for producing an optical material is provided. The production method includes a polymerization step of polymerizing the above-mentioned composition or the above-mentioned pre-cured product.

[Polymerization Step]

The polymerization step is a step of polymerizing the above-mentioned composition or the above-mentioned pre-cured product.

The polymerization step is usually performed by casting the composition or the pre-cured product into a mold or the like and polymerizing the composition or the pre-cured product. When the composition is used, it is preferable to filter and remove impurities with a filter or the like having a pore diameter of about 0.1 to 5 µm before casting from the viewpoint of improving the quality of the optical material.

In one embodiment, the polymerization step includes a step of raising the temperature to a polymerization temperature, a step of maintaining the temperature at the polymerization temperature, and a step of lowering the temperature.

The polymerization may be performed in multiple stages. That is, the polymerization may include two or more steps of maintaining the polymerization temperature. In one embodiment, the polymerization step includes a step of raising the temperature to a first polymerization temperature, a step of maintaining the temperature at the first polymerization temperature, a step of raising the temperature to a second polymerization temperature, a step of maintaining the temperature at the second polymerization temperature, and a step of lowering the temperature. In this case, the first polymerization temperature is lower than the second polymerization temperature. In another embodiment, the polymerization step includes a step of raising the temperature to a first polymerization temperature, a step of maintaining the temperature at the first polymerization temperature, a step of lowering the temperature to a second polymerization temperature, a step of maintaining the temperature at the second polymerization temperature, and a step of lowering the temperature. In this case, the first polymerization temperature is higher than the second polymerization temperature.

The temperature increase rate in the step of raising the temperature is preferably 0.1° C. to 100° C./h. The temperature decrease rate in the step of lowering the temperature is preferably 0.1° C. to 100° C./h.

The polymerization temperature is usually −10° C. to 140° C., and preferably 0 to 140° C.

The polymerization time is usually 1 to 100 hours, and preferably 1 to 72 hours. In the present description, the "polymerization time" means a time including the time for the step of raising the temperature and the time for the step of lowering the temperature.

After the polymerization, the obtained optical material is preferably subjected to an annealing treatment. By performing the annealing treatment, distortion of the optical material can be prevented or reduced. The temperature of the annealing treatment is preferably 50 to 150° C. The time for the annealing treatment is preferably 10 minutes to 5 hours.

The obtained optical material may be optionally subjected to surface treatment such as dyeing, hard coating, impact resistance coating, antireflection, and imparting of antifogging properties.

<Application of Optical Material>

The above-mentioned optical material is useful for various applications such as optical members, mechanical component materials, electrical and electronic component materials, automobile component materials, civil engineering and construction materials, molding materials, as well as materials of paints and adhesives. The optical material is suitably used for, among these, optical applications including lenses such as spectacle lenses, imaging lenses for (digital) cameras, light beam condensing lenses, and light diffusion lenses, LED encapsulants, optical adhesives, joining materials for optical transmission, optical fibers, prisms, filters, diffraction gratings, and transparent glass and cover glass such as watch glass, and cover glass for display devices; and display device applications including substrates for display elements such as LCDs, organic ELs, and PDPs, substrates for color filters, substrates for touch panels, information recording substrates, display backlights, light guide plates, and coating agents (coating films) such as display protective films, antireflection films, and antifogging films. In particular, the optical material is preferably used for applications such as optical lenses, prisms, optical fibers, information recording substrates, and filters, and more preferably used for an optical lens. That is, in one embodiment, an optical lens containing the above-mentioned optical material is provided.

Since the optical lens obtained from the composition according to the present invention is excellent in stability, hue, transparency, and the like, it can be used in fields where expensive high refractive index glass lenses have been conventionally used, such as telescopes, binoculars, and television projectors, and is very useful. If necessary, the optical lens is preferably used in the form of an aspherical lens.

EXAMPLES

Hereinafter, the present invention will be specifically described with reference to examples, but the embodiments can be appropriately changed as long as the effects of the present invention are exhibited.

The optical material was analyzed and evaluated by the following methods.

[Refractive Index of Optical Material]

The refractive index of the optical material at the e-line (546.1 nm) at 25° C. was measured using a digital precision refractometer KPR-3000 (manufactured by Shimadzu Corporation).

[Evaluation of Heat Resistance of Optical Material]

The optical material was cut to a thickness of 3 mm. Measurement was performed by a needle penetration mode with TMA/SS 7100 (manufactured by Seiko Instruments Inc.) that is a TMA (thermomechanical analysis) apparatus. A 0.5 mmφ pin was used as a needle-shaped indenter, and the load applied to the tip of the indenter was set to 50 g. The temperature increase rate was set to 5° C./min. The softening point (Tg) and the DTMA peak value (DTg) were calculated from the peak temperature and peak value of DTMA that is a temperature differential curve of the obtained TMA curve. As the DTMA peak value (DTg) is smaller, the optical material is evaluated as being less likely to suffer from softening by heat and having higher heat resistance. When the peak value was negative or there was no peak, it was determined that the optical material had no softening point.

Heat resistance was evaluated as follows based on the following criteria (X) and (Y).

Criterion (X): Tg≥55° C.
Criterion (Y): DTg≤1.0
 A: the optical material satisfies both the criteria (X) and (Y)
 B: the optical material satisfies one of the criteria (X) and (Y)
 C: the optical material does not satisfy both the criteria (X) and (Y)

Synthesis Example 1: Synthesis of 1,3,5-trimercaptobenzene (hereinafter referred to as TMB)

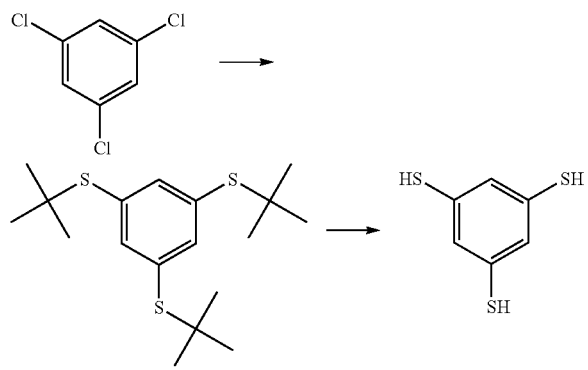

TMB was synthesized with reference to Beilstein Journal of Organic Chemistry, 8, 461-471, No. 53; 2012. Specifically, TMB was synthesized as follows.

That is, a four-necked flask equipped with a thermometer and a dropping funnel was purged with nitrogen. Thereafter, 400 g of N-methylpyrrolidone and 82.7 g (2067 mmol) of sodium hydroxide were added thereto, and the mixture was stirred at 5° C. Subsequently, 186.4 g (2067 mmol) of t-butylthiol was added dropwise thereto, and the mixture was stirred at 5° C. for 3 hours. Further, 50.0 g (275.56 mmol) of 1,3,5-trichlorobenzene was added thereto, the temperature was raised to 120° C., and the mixture was stirred for 24 hours. Then, the reaction liquid was cooled to 25° C., 400 g of toluene was added thereto, then water washing was performed 3 times with 400 g of water, and the solvent was distilled off to give 45.3 g (132.3 mmol) of a crude product of 1,3,5-tris(t-butylthio)benzene (TTBB).

In a three-necked flask equipped with a thermometer, 45.3 g (132.3 mmol) of the obtained crude product of TTBB was placed, and the reaction vessel was purged with nitrogen. Thereafter, 436 g of toluene was added thereto, and the mixture was stirred at 20° C. Subsequently, 19.4 g (145.4 mmol) of aluminum chloride was added thereto, and the mixture was stirred for 3 hours. To the mixture, 225 g of 20% sulfuric acid was added, the toluene layer was washed with water 3 times, and the solvent was distilled off to give 16.1 g (92.4 mmol) of a crude product of TMB.

The obtained crude product of TMB was purified by a silica gel column to give a fraction of TMB 1 (TMB purity: 100%, fraction 1) and two fractions respectively containing TMB 2 and TMB 3 (fractions 2 and 3). The obtained results are shown in Table 1 below.

Synthesis Example 2: Synthesis of TMB

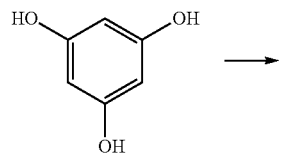

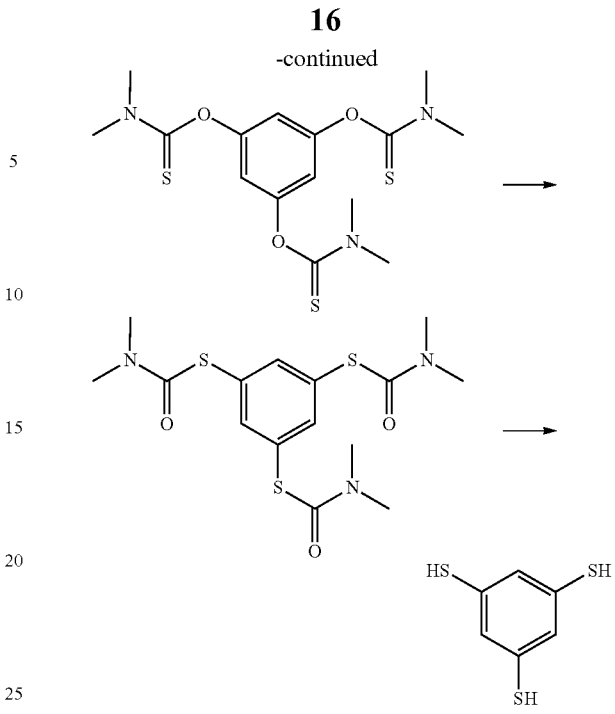

TMB was synthesized with reference to Bulletin de la Societe Chimique de France, (2), 302-8; 1987. Specifically, TMB was synthesized as follows.

That is, 30.0 g (238 mmol) of phloroglucinol and 375 g of N,N-dimethylformamide were added to a three-necked flask equipped with a thermometer. Thereafter, the reaction liquid was cooled to 5° C., 133.4 g (1189 mmol) of 1,4-diazabicyclo[2.2.2]octane and 147.0 g (1189 mmol) of dimethylthiocarbamoyl chloride were added thereto, and the mixture was stirred for 24 hours. Then, 300 g of chloroform was added thereto, then washing was performed 3 times with 300 g of a 10% aqueous NaOH solution, and the solvent was distilled off to give 73.8 g (190 mmol) of a crude product of 1,3,5-tris(dimethylthiocarbamoyl)benzene.

In a three-necked flask equipped with a thermometer, 73.8 g of the obtained crude product of 1,3,5-tris(dimethylthiocarbamoyl)benzene was placed, and stirred at 240° C. for 7 hours. Thereafter, the crude product was cooled to 25° C. to give 73.8 g (190 mmol) of a crude product of 1,3,5-tris(dimethylcarbamoylthio)benzene.

In a three-necked flask equipped with a thermometer, 73.8 g of the obtained crude product of 1,3,5-tris(dimethylcarbamoylthio)benzene was placed. Then, 826 g of diethylene glycol, 89.1 g of water, and 53.4 g (952 mmol) of potassium hydroxide were added thereto, and the mixture was stirred at 95° C. for 10 hours. Thereafter, the mixture was cooled to 25° C., and 370 g of 20% sulfuric acid and 740 g of chloroform were added thereto. The organic layer was washed with water 3 times, and the solvent was distilled off to give 15.9 g (91 mmol) of a crude product of TMB.

The obtained crude product of TMB was purified by a silica gel column to give a fraction of TMB 1 (TMB purity: 100%, TMB fraction 4) and three fractions respectively containing TMB 4, TMB 5, and TMB 6 (TMB fractions 5 to 7). The obtained results are shown in Table 1 below.

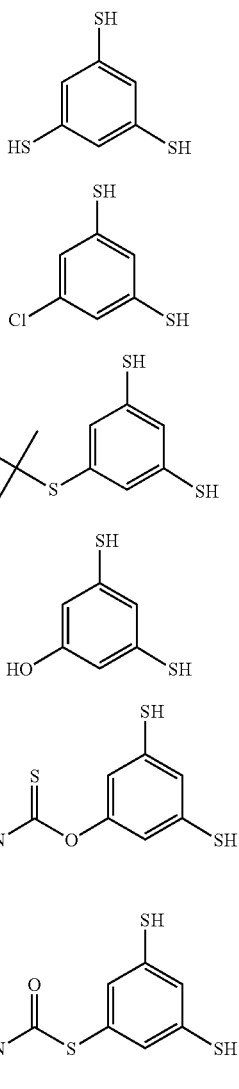

TMB1
TMB2
TMB3
TMB4
TMB5
TMB6

1 was placed, and the reaction vessel was purged with nitrogen. Thereafter, a solution obtained by dissolving 0.72 g of a 24% aqueous sodium hydroxide solution in 59.4 g of methanol and 65.0 g of toluene were added to the above reaction vessel, and the mixture was stirred while being cooled to 5° C. Then, with stirring, 24.7 g (266.8 mmol) of epichlorohydrin was added dropwise thereto while the liquid temperature was maintained at 5 to 15° C. After completion of the dropwise addition, the mixture was further stirred at 5° C. for 3 hours to give 1,3,5-tris(3-chloro-2-hydroxypropylthio)benzene.

Then, 64.6 g (387.3 mmol) of a 24% aqueous sodium hydroxide solution was added dropwise thereto while the liquid temperature was maintained at 5 to 15° C. After completion of the dropwise addition, the liquid temperature was set to 15° C., and the mixture was aged for 17 hours. The organic layer was washed with 150 g of water 3 times, and the solvent was distilled off to give 29.0 g of 1,3,5-tris($\beta$-epoxy propylthio)benzene (total yield: 98%).

To 29.0 g (84.7 mol) of the obtained 1,3,5-tris(O-epoxypropylthio)benzene, 145 mL of toluene, 145 mL of methanol, 1.56 g (15.2 mmol) of acetic anhydride, and 38.7 g (508.0 mmol) of thiourea were added, and the mixture was stirred at 20° C. for 24 hours. To the mixture, 145 mL of 20% sulfuric acid was added, the toluene layer was washed with water 3 times, and the solvent was distilled off to give 23.1 g of a crude product of 1,3,5-tris($\beta$-epithiopropylthio)benzene (hereinafter referred to as Compound 1). The crude product was purified by a silica gel column to give a fraction of Compound 1 (fraction a-1) having a purity of 100% and two fractions respectively containing Compound 2 (1-mercapto-3,5-bis($\beta$-epothiopropylthio)benzene) and Compound 3 (1-($\beta$-epoxypropylthio)-3,5-bis($\beta$-epothiopropylthio)benzene) (fractions a-2 and a-3). The obtained results are shown in Table 2 below.

Synthesis Example 4: Synthesis of Episulfide Compound

A crude product of Compound 1 was obtained in the same manner as in Synthesis Example 3 except that the TMB fraction 2 was used instead of the TMB fraction 1. The crude product was purified by a silica gel column to give a fraction of Compound 1 (fraction a-1) having a purity of 100% and a fraction containing Compound 4 (1-chloro-3,5-bis($\beta$-epothiopropylthio)benzene) (fraction a-4). The obtained results are shown in Table 2 below.

TABLE 1

|  |  | TMB 1 | TMB 2 | TMB 3 | TMB 4 | TMB 5 | TMB 6 |
|---|---|---|---|---|---|---|---|
| Synthesis Example 1 | TMB fraction 1 | 100 |  |  |  |  |  |
|  | TMB fraction 2 | 95 | 5 |  |  |  |  |
|  | TMB fraction 3 | 95 |  | 5 |  |  |  |
| Synthesis Example 2 | TMB fraction 4 | 100 |  |  |  |  |  |
|  | TMB fraction 5 | 95 |  |  | 5 |  |  |
|  | TMB fraction 6 | 95 |  |  |  | 5 |  |
|  | TMB fraction 7 | 95 |  |  |  |  | 5 |

Synthesis Example 3: Synthesis of Episulfide Compound

In a four-necked flask equipped with a thermometer and a dropping funnel, 15.0 g (86.1 mmol) of the TMB fraction

Synthesis Example 5: Synthesis of Episulfide Compound

A crude product of Compound 1 was obtained in the same manner as in Synthesis Example 3 except that the TMB fraction 3 was used instead of the TMB fraction 1. The crude product was purified by a silica gel column to give a fraction of Compound 1 (purity of Compound 1: 100%, fraction a-1) and a fraction containing Compound 5 (1-t-butylthio-3,5-bis(β-epothiopropylthio)benzene) (fraction a-5). The obtained results are shown in Table 2 below.

Synthesis Example 6: Synthesis of Episulfide Compound

A crude product of Compound 1 was obtained in the same manner as in Synthesis Example 3 except that the TMB fraction 5 was used instead of the TMB fraction 1. The crude product was purified by a silica gel column to give a fraction of Compound 1 (purity of compound 1: 100%, fraction a-1) and a fraction containing a compound (1-hydroxy-3,5-bis(β-epothiopropylthio)benzene) (fraction a-6). The obtained results are shown in Table 2 below.

Synthesis Example 7: Synthesis of Episulfide Compound

A crude product of Compound 1 was obtained in the same manner as in Synthesis Example 3 except that the TMB fraction 6 was used instead of the TMB fraction 1. The crude product was purified by a silica gel column to give a fraction of a compound (fraction a-1) having a purity of 100% and a fraction containing Compound 7 (1-dimethylthiocarbamoyl-3,5-bis(β-epothiopropylthio)benzene) (fraction a-7). The obtained results are shown in Table 2 below.

Synthesis Example 8: Synthesis of Episulfide Compound

A crude product of Compound 1 was obtained in the same manner as in Synthesis Example 3 except that the TMB fraction 7 was used instead of the TMB fraction 1. The crude product was purified by a silica gel column to give a fraction of Compound 1 (fraction a-1) having a purity of 100% and a fraction containing Compound 8 (1-dimethylcarbamoylthio-3,5-bis(β-epothiopropylthio)benzene) (fraction a-8). The obtained results are shown in Table 2 below.

Synthesis Example 9: Synthesis of Episulfide Compound

A crude product of Compound 9 (1,3-bis(β-epithiopropylthio)benzene) was obtained in the same manner as in Synthesis Example 3 except that 1,3-dimercaptobenzene (manufactured by Tokyo Chemical Industry Co., Ltd.) was used instead of the TMB fraction 1. The crude product was purified by a silica gel column to give a fraction of Compound 9 (fraction a-9) having a purity of 100%. The obtained results are shown in Table 2 below.

Synthesis Example 10: Synthesis of Episulfide Compound

A crude product of Compound 10 (2,5-bis(β-epithiopropylthio)-1,3,4-thiadiazole) was obtained in the same manner as in Synthesis Example 3 except that bismuthiol (manufactured by Tokyo Chemical Industry Co., Ltd.) was used instead of the TMB fraction 1. The crude product was purified by a silica gel column to give a fraction of Compound 10 (purity: 100%, fraction a-10). The obtained results are shown in Table 2 below.

Synthesis Example 11: Synthesis of Episulfide Compound

A crude product of Compound 11 (2,4,6-tris(β-epithiopropylthio)-1,3,5-triazine) was obtained in the same manner as in Synthesis Example 3 except that thiocyanuric acid (manufactured by Tokyo Chemical Industry Co., Ltd.) was used instead of the TMB fraction 1. The crude product was purified by a silica gel column to give a fraction of Compound 11 (purity: 100%, fraction a-11). The obtained results are shown in Table 2 below.

Compound-1: 1,3,5-tris(β-epithiopropylthio)benzene

Compound-2: 1-mercapto-3,5-bis(β-epothiopropylthio)benzene

Compound-3: 1-(β-epoxypropylthio)-3,5-bis(β-epothiopropylthio)benzene

Compound-4: 1-chloro-3,5-bis(β-epothiopropylthio)benzene

Compound-5: 1-t-butylthio-3,5-bis(β-epothiopropylthio)benzene

Compound-6: 1-hydroxy-3,5-bis(β-epothiopropylthio)benzene

Compound-7: 1-dimethylthiocarbamoyl-3,5-bis(β-epothiopropylthio)benzene

Compound-8: 1-dimethylcarbamoylthio-3,5-bis(β-epothiopropylthio)benzene

Compound-9: 1,3-bis(β-epithiopropylthio)benzene

Compound 10: 2,5-bis(β-epithiopropylthio)-1,3,4-thiadiazole

Compound 11: 2,4,6-tris(β-epithiopropylthio)-1,3,5-triazine

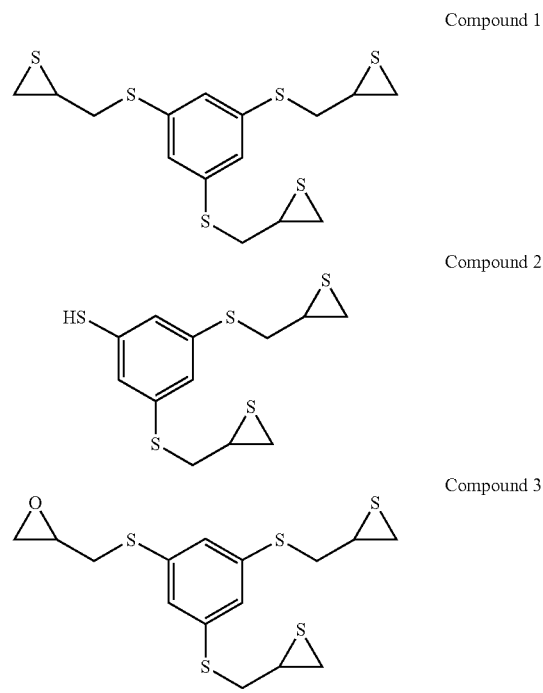

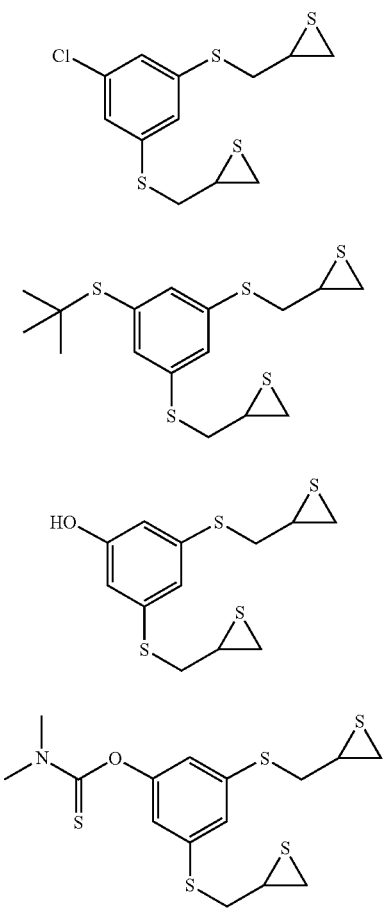

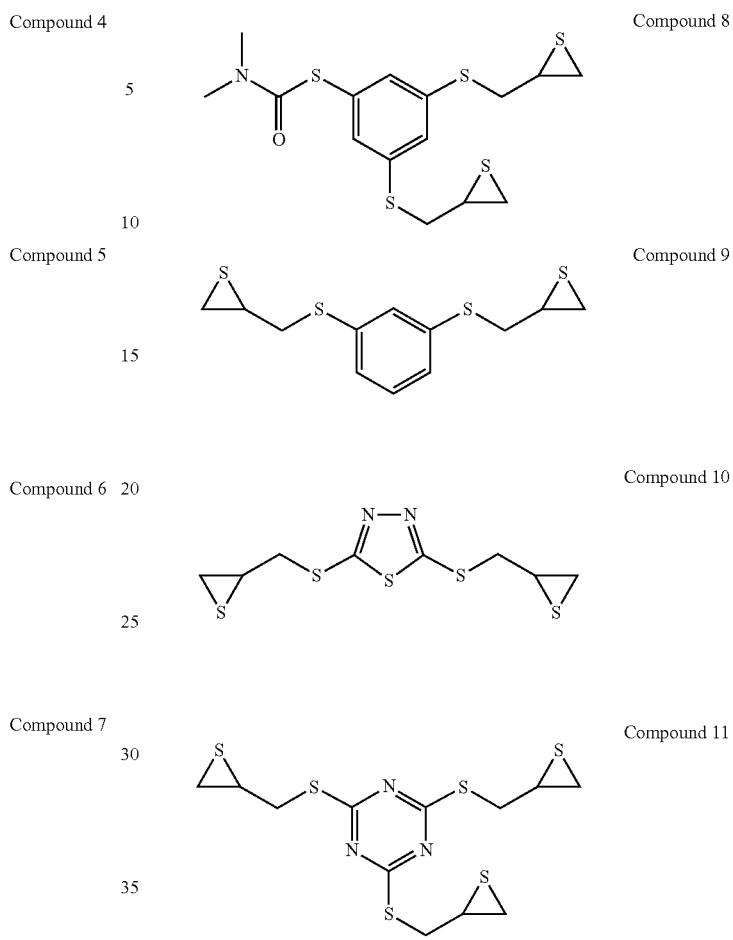

TABLE 2

| | | | Compound 1 | Compound 2 | Compound 3 | Compound 4 | Compound 5 | Compound 6 | Compound 7 | Compound 8 | Compound 9 | Compound 10 | Compound 11 |
|---|---|---|---|---|---|---|---|---|---|---|---|---|---|
| Synthesis Example 3 | TMB fraction 1 | a-1 | 100 | | | | | | | | | | |
| | | a-2 | 99.5 | 0.5 | | | | | | | | | |
| | | a-3 | 99.5 | | 0.5 | | | | | | | | |
| Synthesis Example 4 | TMB fraction 2 | a-1 | 100 | | | | | | | | | | |
| | | a-4 | 99.5 | | | 0.5 | | | | | | | |
| Synthesis Example 5 | TMB fraction 3 | a-1 | 100 | | | | | | | | | | |
| | | a-5 | 99.5 | | | | 0.5 | | | | | | |
| Synthesis Example 6 | TMB fraction 4 | a-1 | 100 | | | | | | | | | | |
| | | a-6 | 99.5 | | | | | 0.5 | | | | | |
| Synthesis Example 7 | TMB fraction 5 | a-1 | 100 | | | | | | | | | | |
| | | a-7 | 99.5 | | | | | | 0.5 | | | | |
| Synthesis Example 8 | TMB fraction 6 | a-1 | 100 | | | | | | | | | | |
| | | a-8 | 99.5 | | | | | | | 0.5 | | | |
| Synthesis Example 9 | 1,3-dimercaptobenzene | a-9 | | | | | | | | | 100 | | |
| Synthesis Example 10 | bismuthiol | a-10 | | | | | | | | | | 100 | |
| Synthesis Example 11 | thiocyanuric acid | a-11 | | | | | | | | | | | 100 |

[Raw Materials]

1,2,3,5,6-Pentathiepane (b) was prepared.

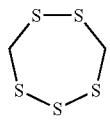

In addition, the following compounds c-1 to c-3 were prepared as the compound (c).
- c-1: bis(β-epithiopropyl)sulfide
- c-2: bis(β-epithiopropyl)disulfide
- c-3: tetrakis(β-epithiopropylthiomethyl)methane

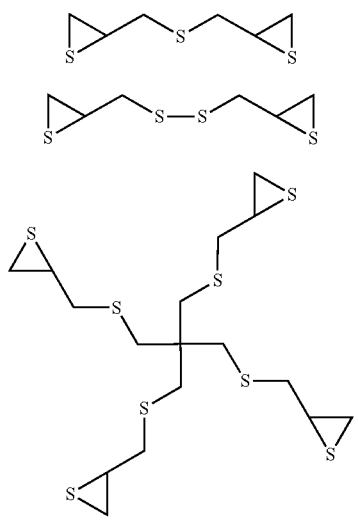

Furthermore, the following compounds d-1 to d-3 were prepared as the polythiol (d).
- d-1: bis(2-mercaptoethyl)sulfide
- d-2: 4,8-dimercaptomethyl-1,11-dimercapto-3,6,9-trithiaundecane
- d-3: 1,2,6,7-tetramercapto-4-thiaheptane

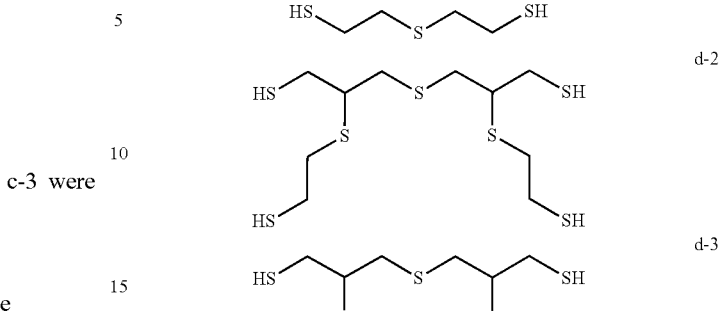

Example 1

While 65 parts by mass of the fraction a-1, 35 parts by mass of 1,2,3,5,6-pentathiepane (b) (hereinafter simply referred to as "pentathiepane (b)"), 0.02 parts by mass of tetra-n-butylphosphonium bromide as a polymerization catalyst, and 0.05 parts by mass of di-n-butyltin dichloride as a polymerization modifier were mixed at 60° C., vacuum degassing was performed to produce a composition.

Examples 2 to 22 and Comparative Examples 1 to 4

A composition was produced in the same manner as in Example 1 except that the chemical composition was changed as shown in Table 3.

[Evaluation]

The compositions produced in Examples 1 to 22 and Comparative Examples 1 to 4 were heated at 60° C. for 5 hours, the temperature was raised to 100° C. over 2 hours, and the compositions were finally heated at 100° C. for 1 hour for polymerization curing. After the compositions were left standing for cooling, an annealing treatment was performed at 120° C. for 30 minutes to produce optical materials.

The results of evaluation of the refractive index and heat resistance of the produced optical materials are shown in Table 3 below.

TABLE 3

| | Compound (a) | | Pentathiepane (b) | Compound (c) | | Polythiol (d) | | Sulfur | Refractive index | Tg [° C.] | DTg [μm/° C.] | Heat Evaluation resistance |
|---|---|---|---|---|---|---|---|---|---|---|---|---|
| | Fraction | Content (mass %) | Content (mass %) | Type | Content (mass %) | Type | Content (mass %) | Content (mass %) | | | | |
| Example 1 | a-1 | 65 | 35 | — | 0 | — | 0 | 0 | 1.791 | 6 | 0.9 | A |
| Example 2 | a-1 | 70 | 20 | — | 0 | d-1 | 10 | 0 | 1.771 | 61.6 | 0.6 | A |
| Example 3 | a-1 | 80 | 10 | — | 0 | d-1 | 10 | 0 | 1.763 | No softening point | | A |
| Example 4 | a-1 | 60 | 25 | — | 0 | d-1 | 5 | 10 | 1.798 | 64 | 0.8 | A |
| Example 5 | a-1 | 40 | 20 | c-1 | 40 | — | 0 | 0 | 1.758 | 73 | 0.1 | A |
| Example 6 | a-9 | 40 | 20 | c-1 | 40 | — | 0 | 0 | 1.752 | 65 | 0.5 | A |
| Example 7 | a-10 | 40 | 20 | c-1 | 40 | — | 0 | 0 | 1.756 | 59 | 0.4 | A |
| Example 8 | a-11 | 40 | 20 | c-1 | 40 | — | 0 | 0 | 1.760 | 77 | 0.1 | A |
| Example 9 | a-1 | 40 | 20 | c-2 | 40 | — | 0 | 0 | 1.759 | 73 | 0.3 | A |
| Example 10 | a-1 | 58 | 28 | c-1 | 5 | — | 0 | 9.3 | 1.801 | 79 | 0.3 | A |
| Example 11 | a-1 | 59 | 22 | c-1 | 3 | d-1 | 5 | 11 | 1.795 | 76 | 0.2 | A |
| Example 12 | a-1 | 59 | 22 | c-1 | 3 | d-2 | 5 | 11 | 1.796 | 77 | 0.1 | A |

TABLE 3-continued

| | | Compound (a) | Pentathiepane (b) | Compound (c) | | Polythiol (d) | | Sulfur | | | | Heat |
| | Fraction | Content (mass %) | Content (mass %) | Type | Content (mass %) | Type | Content (mass %) | Content (mass %) | Refractive index | Tg [° C.] | DTg [μm/° C.] | Evaluation resistance |
|---|---|---|---|---|---|---|---|---|---|---|---|---|
| Example 13 | a-1 | 59 | 22 | c-1 | 3 | d-3 | 5 | 11 | 1.797 | 77 | 0.0 | A |
| Example 14 | a-1 | 30 | 10 | c-1 | 40 | — | 0 | 20 | 1.784 | No softening point | | A |
| Example 15 | a-1 | 20 | 30 | c-1 | 30 | d-1 | 1 | 19 | 1.814 | 56 | 0.4 | A |
| Example 16 | a-2 | 59 | 22 | c-1 | 3 | d-1 | 5 | 11 | 1.795 | 74 | 0.3 | A |
| Example 17 | a-3 | 59 | 22 | c-1 | 3 | d-1 | 5 | 11 | 1.795 | 76 | 0.1 | A |
| Example 18 | a-4 | 59 | 22 | c-1 | 3 | d-1 | 5 | 11 | 1.795 | 75 | 0.3 | A |
| Example 19 | a-5 | 59 | 22 | c-1 | 3 | d-1 | 5 | 11 | 1.794 | 75 | 0.2 | A |
| Example 20 | a-6 | 59 | 22 | c-1 | 3 | d-1 | 5 | 11 | 1.794 | 76 | 0.1 | A |
| Example 21 | a-7 | 59 | 22 | c-1 | 3 | d-1 | 5 | 11 | 1.795 | 75 | 0.2 | A |
| Example 22 | a-8 | 59 | 22 | c-1 | 3 | d-1 | 5 | 11 | 1.795 | 75 | 0.3 | A |
| Comparative Example 1 | — | 0 | 35 | c-1 | 65 | — | 0 | 0 | 1.751 | 51 | 7.3 | C |
| Comparative Example 2 | — | 0 | 35 | c-3 | 65 | — | 0 | 0 | 1.752 | 65 | 1.3 | B |
| Comparative Example 3 | — | 0 | 20 | c-1 | 70 | d-1 | 10 | 0 | 1.729 | 48 | 6.0 | C |
| Comparative Example 4 | — | 0 | 25 | c-1 | 60 | d-1 | 5 | 10 | 1.755 | 48 | 3.1 | C |

As is apparent from the results in Table 3, the cured products (optical materials) obtained by curing the compositions of Examples 1 to 22 have a high refractive index and excellent heat resistance.

Meanwhile, in Comparative Examples 1 and 2, when the 1,2,3,5,6-pentathiepane (b) was added to the compound c-1 (bis(β-epithiopropyl)sulfide) or the compound c-3, which were conventionally used, the optical materials had insufficient heat resistance although they had high refractive indices.

In addition, the optical materials of Comparative Example 3 in which the polythiol (d) was added and Comparative Example 4 in which the polythiol (d) and sulfur were added also had insufficient heat resistance.

The invention claimed is:

1. A composition comprising:
a compound (a) represented by Formula (1):

$$R^1{}_n\text{-Ar}\left[\text{-S-CH}_2\text{-CH(S)CH}_2\right]_m \quad (1)$$

wherein
Ar represents an aromatic ring,
m represents an integer of 2 to 8,
n represents an integer of 0 to 6,
provided that m+n is equal to or less than a number of carbon atoms that constitute the aromatic ring, and
$R^1$ each independently represents an alkylthio group, an epoxyalkylthio group, a thiol group, a halogen group, a hydroxy group, a dialkylthiocarbamoyl group, or a dialkylcarbamoylthio group; and
1,2,3,5,6-pentathiepane (b).

2. The composition according to claim 1, wherein m is 2 or 3.

3. The composition according to claim 1, wherein m+n is 2 to 6.

4. The composition according to claim 1, wherein a content of the compound (a) is 20 to 80 mass % with respect to a total mass of the composition.

5. The composition according to claim 1, wherein a content of the 1,2,3,5,6-pentathiepane (b) is 5 to 40 mass % with respect to a total mass of the composition.

6. The composition according to claim 1, further comprising a compound (c) represented by Formula (2):

$$\text{(epithio)-S-[(-)}_p\text{-S-]}_q\text{-(epithio)} \quad (2)$$

wherein
p represents an integer of 0 to 4, and
q represents an integer of 0 to 2.

7. The composition according to claim 6, wherein a content of the compound (c) is 5 to 40 mass % with respect to a total mass of the composition.

8. The composition according to claim 1, further comprising a polythiol (d).

9. The composition according to claim 8, wherein the polythiol (d) includes at least one selected from the group consisting of 1,2,6,7-tetramercapto-4-thiaheptane, methanedithiol, (sulfanylmethyldisulfanyl)methanethiol, bis(2-mercaptoethyl)sulfide, 2,5-bis(mercaptomethyl)-1,4-dithiane, 1,2-bis(2-mercaptoethylthio)-3-mercaptopropane, 4,8-dimercaptomethyl-1,11-dimercapto-3,6,9-trithiaundecane, 4,7-dimercaptomethyl-1,11-dimercapto-3,6,9-trithiaundecane, 5,7-dimercaptomethyl-1,11-dimercapto-3,6,9-trithiaundecane, 1,1,3,3-tetrakis(mercaptomethylthio)propane, tetramercaptopentaerythritol, 1,3-bis(mercaptomethyl)benzene, 1,4-bis(mercaptomethyl)benzene, and thiiranemethanethiol.

10. The composition according to claim 1, further comprising sulfur.

11. The composition according to claim 1, further comprising a prepolymerization catalyst.

12. The composition according to claim 11, wherein the prepolymerization catalyst includes at least one selected from the group consisting of 2-mercapto-1-methylimidazole, 2-methyl-N-imidazole, and 1,2,2,6,6-pentamethylpiperidyl methacrylate.

13. A pre-cured product obtained by prepolymerizing the composition according to claim 1.

14. An optical material obtained by curing the composition according to claim 1.

15. An optical lens comprising the optical material according to claim 14.

* * * * *